A. SACHSSE.
STORAGE PLANT FOR EXPLOSIVE LIQUIDS.
APPLICATION FILED MAY 29, 1908.
1,053,878.
Patented Feb. 18, 1913.
2 SHEETS—SHEET 1.
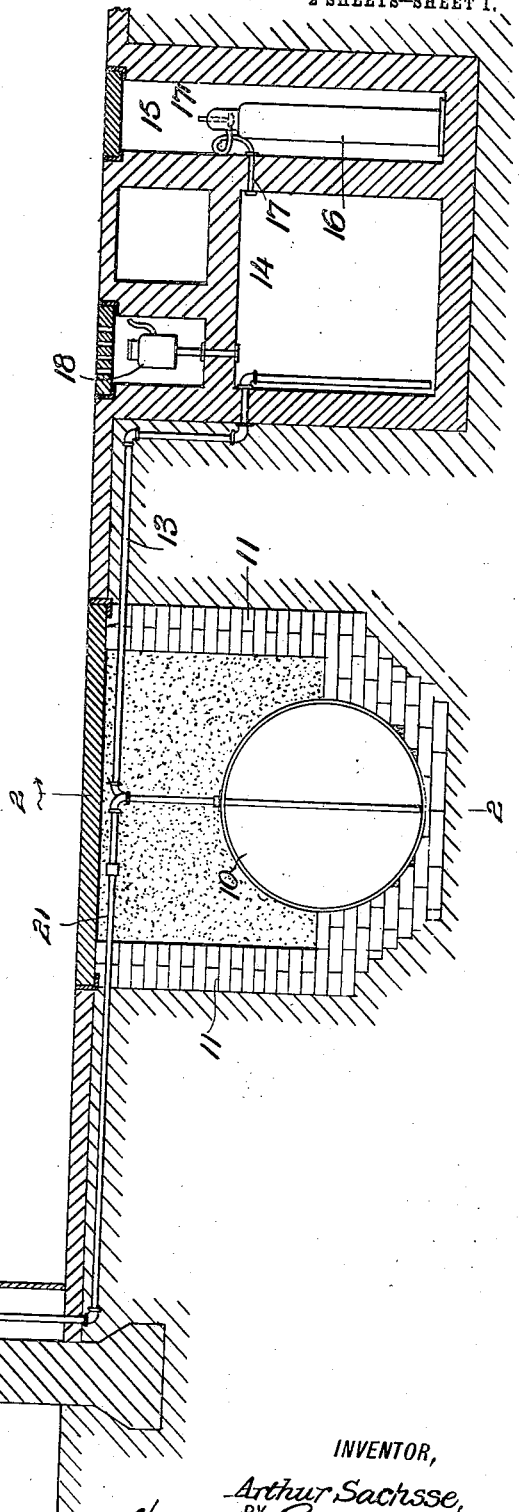
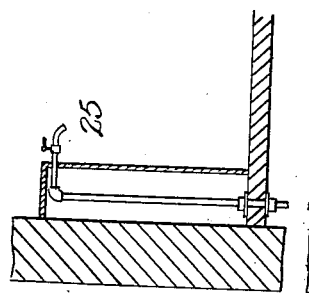

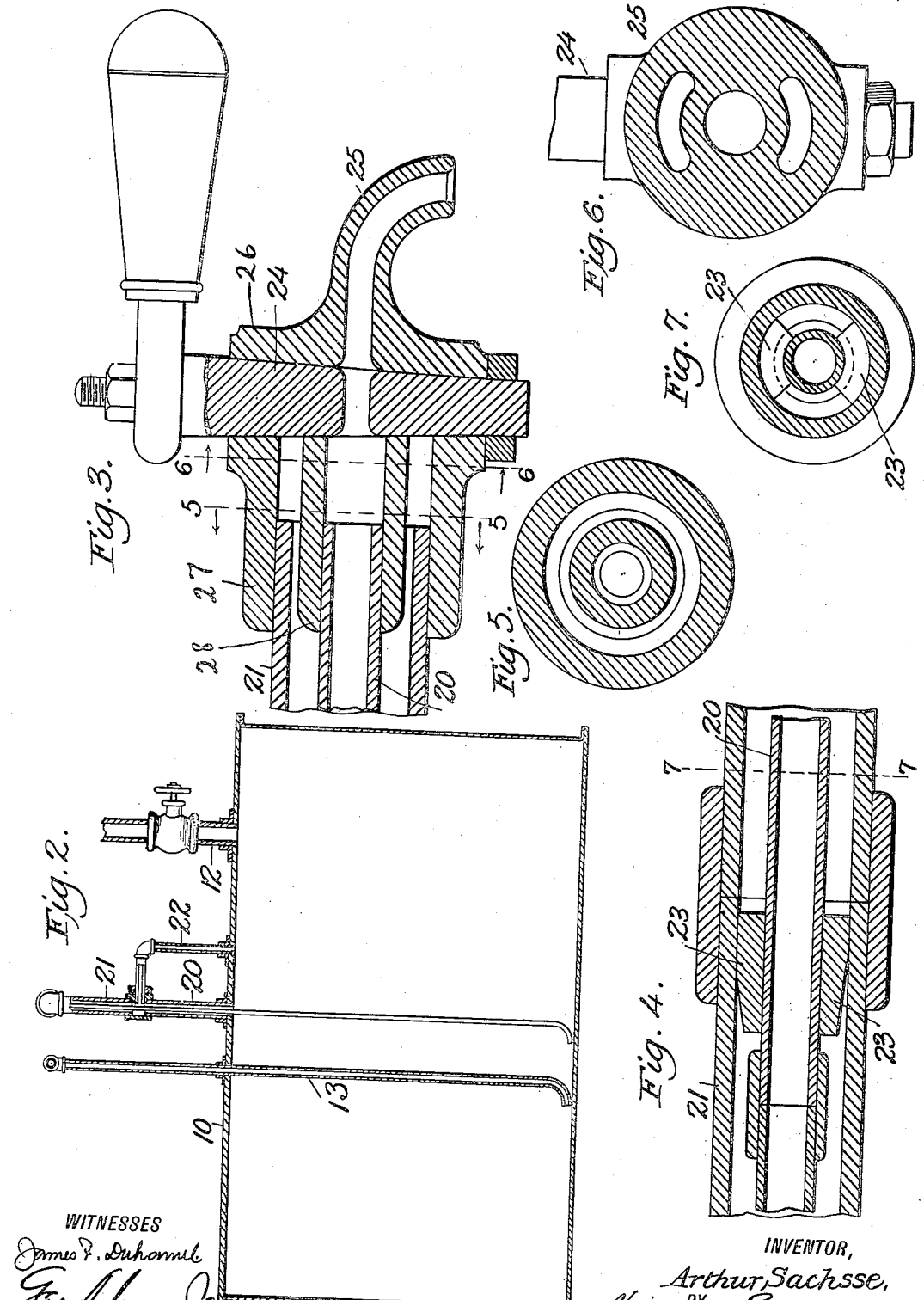

UNITED STATES PATENT OFFICE.

ARTHUR SACHSSE, OF NEW YORK, N. Y.

STORAGE PLANT FOR EXPLOSIVE LIQUIDS.

1,053,878.

Specification of Letters Patent. Patented Feb. 18, 1913.

Application filed May 29, 1908. Serial No. 435,676.

*To all whom it may concern:*

Be it known that I, ARTHUR SACHSSE, a subject of the Emperor of Germany, residing at New York, in the county of New York and State of New York, have invented new and useful Improvements in Storage Plants for Explosive Liquids, of which the following is a specification.

This invention relates to storage plants for explosive or inflammable fluids and particularly to those plants wherein the reservoir for the explosive fluid is located in a sealed trench formed in the ground.

The primary object of the invention is the employment of a lifting agent, such as gas, to force the fluid from the reservoir, up through a pipe line and to a faucet located in the latter, from whence it can be drawn off in the ordinary manner.

Another object is the provision of a specific form of pipe line for conducting the fluid from the reservoir to the drawing-off point, so that in the event of the pipe line breaking the lifting agent will escape to the atmosphere, whereby the liquid will descend to the reservoir.

With these and other objects in view, which will more fully hereinafter appear, the present invention consists in certain novel details of construction and arrangement of parts, hereinafter fully described, illustrated in the accompanying drawings, and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming part of the specification;—Figure 1 is a view partly in section and elevation disclosing the arrangement of the several parts of the plant. Fig. 2 is a longitudinal sectional view approximately on the line 2—2 of Fig. 1 and looking in the direction of the arrow. Fig. 3 is a detail longitudinal section of the outlet pipe and faucet. Fig. 4 is a detail longitudinal sectional view of the outlet pipe. Fig. 5 is a sectional end view on the line 5—5 of Fig. 3 looking in the direction of the arrow. Fig. 6 is a similar view on the line 6—6 of Fig. 3 and looking in the direction of the arrow. Fig. 7 is a sectional end view on the line 7—7 of Fig. 4.

The reservoir for the liquid is designated by the numeral 10, the said reservoir being substantially cylindrical and arranged in a pit having side walls 11 of brick, the pit being sealed by sand or the like so as to completely house the reservoir within. Located in another pit and adjacent to the reservoir 10 is what will subsequently be termed a gas reservoir 14, which is charged from a gas tank 16 located in a third pit 15. The outlet pipe 17 of the gas tank 16 at its juncture with the gas tank is provided with a reducing valve 17′, its opposite end extending into the gas reservoir 14. The gas reservoir 14 is provided with a safety valve 18 which is located above the gas reservoir 14 so that in the event of the pressure in the gas tank 14 rising above a predetermined amount the safety valve will open and permit the gas to escape to the atmosphere.

Connection between the tanks 10 and 14 is established by means of a pipe 13, one end of which extends to a point adjacent to the bottom of the gas tank 14, and the opposite end of which extends to a point adjacent to the lower end of the tank 10, the medial portion of the pipe being located below the surface of the ground and above the tanks 10 and 14.

What will subsequently be termed the outlet of the liquid reservoir comprises a pipe 20, the lower end of which extends to the lower end portion of the reservoir 10, the said pipe extending through the upper end of the reservoir, and thence being directed in any suitable manner to a nozzle to be described later. Surrounding that portion of the pipe located exteriorly of the reservoir 10 is a pipe 21, held in spaced relation and concentric to the pipe 20 by means of wedges 23 bearing on diametrically opposite points on the inner surface of the pipe 21 and outer surface of the pipe 20. Communication between the tank 10 and the space between the pipes 20 and 21 is established by means of a pipe 22, one end of which leads into the upper end of the reservoir 10 and the opposite end of which communicates with the space between the pipes 20 and 21 and at a point slightly above the tank 10.

The inlet pipe of the tank 10 is designated by the numeral 12. In Fig. 2 a detail of this pipe is shown provided with a valve, the upper end of the pipe, not shown, being adapted to be connected to a barrel, not shown, or other source of supply.

The faucet through which the liquid passes from the pipe 20 is of peculiar construction, as shown in Fig. 3. By reference now to the said figure it will be seen that the body portion of the faucet is oblong in contour having a vertical bore for the reception of the cock 24. Extending outwardly and downwardly from one side of the body portion 26 is a nozzle 25, the opening of which alines with the transverse opening formed in the cock 24 when the latter is turned to the position shown in Fig. 3. Arranged on that side of the body portion 26 opposite to the nozzle 25 are a pair of spaced concentric tubular extensions, the outer of which is designated by the numeral 27, and the inner by the numeral 28. The inner extension 28 is in axial alinement with the inner end of the nozzle 25 and receives the outer end of the pipe 20, while the space between the extensions 27 and 28 receives the outer end of the pipe 21. With this construction it will be manifest when the cock is turned to the position shown in Fig. 3 that communication will be established between the atmosphere and tank 10 through the pipe 20.

In the operation of the device and assuming that the tank 10 is partially filled with liquid and the valve in the inlet pipe 12 closed, the gas tank 16 is then connected to the pipe 17, whereupon the gas will pass from the tank into the compartment 14 from whence it will pass through the pipe into the tank 10. From the tank 10 the gas will rise through the extension 22 and into the space between the pipes 20 and 21. Assuming now that the pressure in the reservoir 14 is sufficient to force the entire volume of liquid in the tank 10 upwardly through the pipe 20 it will be manifest that after the gas enters the space between the pipes 20 and 21 it will continue to flow into the tank 10, whereby the liquid in the latter will be forced upwardly through the pipe 20 to the nozzle, so that when the cock 24 in the latter is turned to the position shown in Fig. 3 the liquid will flow through the nozzle 25.

With this construction it will be manifest that in the event of the outlet pipe line becoming broken the outer pipe 21 will naturally be broken first and if this break occurs at any point between the tank 10 and faucet the gas will immediately escape, whereby the pressure in the tank 10 will be reduced with the result that the liquid in the pipe 20 will flow downwardly and into the tank.

I claim:

A safety storage plant of the character described comprising a liquid holding reservoir, a gas tank, a pipe line connecting said tank and reservoir, a second reservoir interposed between the tank and the first-mentioned reservoir and adapted to receive the gas from the tank previous to such gas entering the liquid reservoir, a liquid outlet pipe leading from the first reservoir, a gas outlet pipe disposed concentrically of the first pipe and spaced therefrom, wedges maintaining said pipes in spaced relation, a faucet comprising a body portion connected to the free extremities of said gas and liquid pipes, and a turning plug within said body and adapted to permit the flow of fluid from the liquid pipe and designed to maintain the adjacent or free end of the gas conducting pipe sealed or closed.

In testimony whereof I affix my signature in presence of two witnesses.

ARTHUR SACHSSE.

Witnesses:
JAMES F. DUHAMEL,
MAE W. CLINTON.